US009003320B2

(12) United States Patent
Oh et al.

(10) Patent No.: US 9,003,320 B2
(45) Date of Patent: Apr. 7, 2015

(54) IMAGE FORMING APPARATUS WITH TOUCHSCREEN AND METHOD OF EDITING INPUT LETTER THEREOF

(75) Inventors: Seung-Hee Oh, Bucheon-si (KR); Jeong-Soo Han, Seongnam-si (KR); Joong-Mok Lee, Yongin-si (KR); Seung-Hae Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 620 days.

(21) Appl. No.: 12/926,185

(22) Filed: Oct. 29, 2010

(65) Prior Publication Data

US 2011/0154246 A1   Jun. 23, 2011

(30) Foreign Application Priority Data

Dec. 21, 2009 (KR) .................. 10-2009-0128338

(51) Int. Cl.
*G06F 3/041* (2006.01)
*G06F 3/0488* (2013.01)

(52) U.S. Cl.
CPC ............ *G06F 3/04886* (2013.01); *G06F 3/041* (2013.01); *G06F 2203/04805* (2013.01)

(58) Field of Classification Search
None
See application file for complete search history.

(56) References Cited

U.S. PATENT DOCUMENTS

| 6,169,538 | B1 * | 1/2001 | Nowlan et al. ................. 345/168 |
| 6,876,354 | B1 * | 4/2005 | Terasaki et al. ............... 345/168 |
| 2009/0135147 | A1 * | 5/2009 | Hsu et al. ....................... 345/173 |
| 2010/0003038 | A1 * | 1/2010 | Jo .................................... 399/23 |
| 2010/0107062 | A1 * | 4/2010 | Bacus et al. ................... 715/269 |
| 2011/0018812 | A1 * | 1/2011 | Baird ............................. 345/173 |
| 2011/0035209 | A1 * | 2/2011 | Macfarlane ....................... 704/9 |

* cited by examiner

*Primary Examiner* — Matt Kim
*Assistant Examiner* — Tuan S Nguyen
(74) *Attorney, Agent, or Firm* — Staas & Halsey LLP

(57) ABSTRACT

Provided are an image forming apparatus with a touchscreen and a method of editing input letters using the same. In the method, an inputted text is displayed on the touchscreen using keys of the soft keyboard. A letter to be edited is received from the displayed text. At least one of coordinates representing adjacent keys of the soft keyboard is determined based on a coordinate corresponding to a location of the received letter on the touchscreen. At least one of the magnified images of the adjacent keys corresponding to the determined coordinates and functions keys is displayed. The displayed text is edited using a letter corresponding to one key that is selected from the magnified image of the adjacent keys.

20 Claims, 7 Drawing Sheets

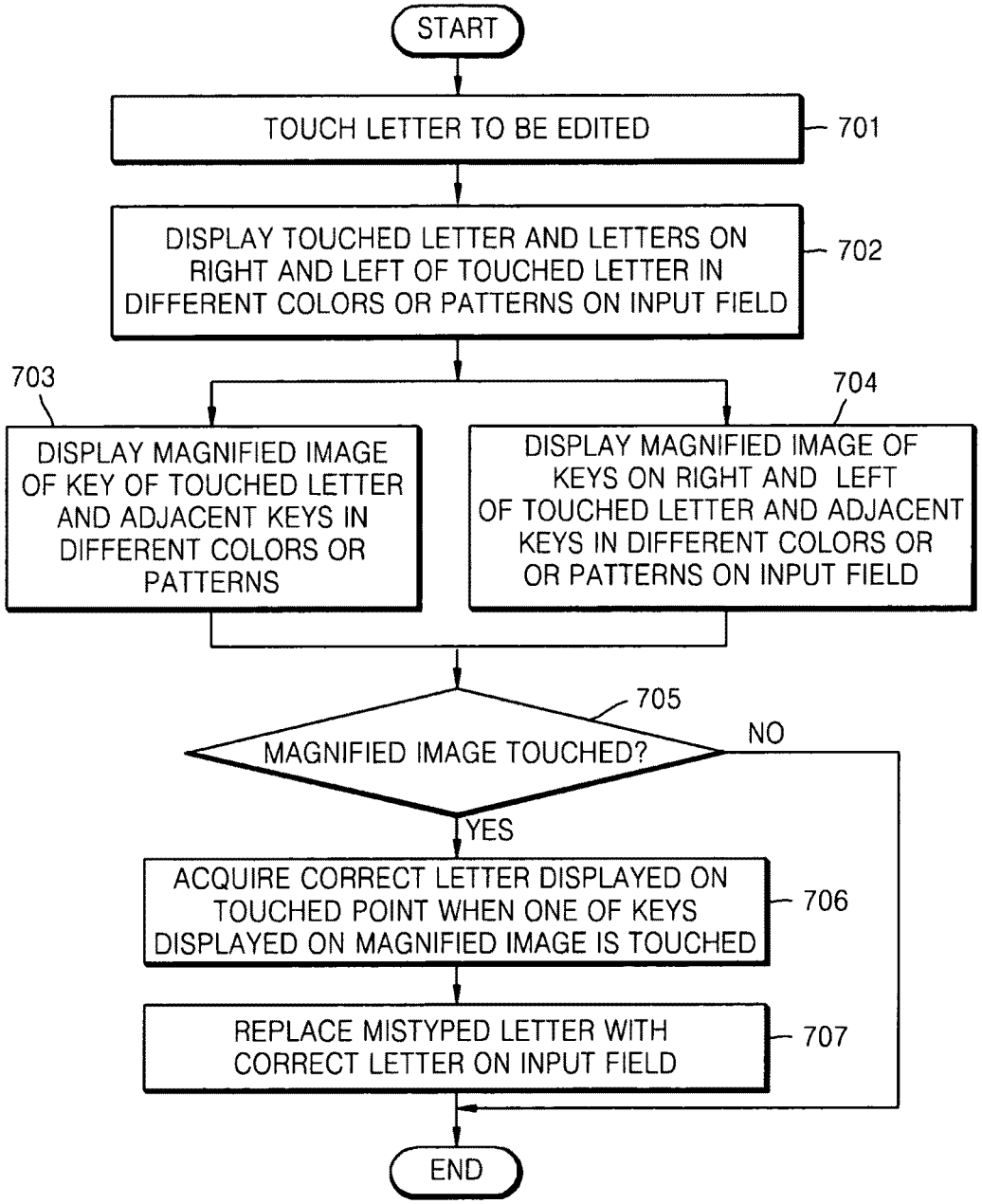

IMAGE FORMING APPARATUS WITH TOUCHSCREEN AND METHOD OF EDITING INPUT LETTER THEREOF

CROSS-REFERENCE TO RELATED APPLICATIONS

This application claims the benefit of Korean Patent Application No. 10-2009-0128338, filed on Dec. 21, 2009, in the Korean Intellectual Property Office, the disclosure of which is incorporated herein in its entirety by reference.

BACKGROUND

1. Field

The embodiments relate to an image forming apparatus with a touchscreen and a method of editing input letters using the same.

2. Description of the Related Art

As a method of inputting letters using a touchscreen in a user interface device, there is a virtual keyboard input method or a soft keyboard input method. In the soft keyboard input method, a user inputs information selected according to touches to an input field of a keyboard type by a finger or a pen. Examples of user interface devices including such a touchscreen include electronic notebooks, mobile communication terminals, Personal Digital Assistants (PDAs), and kiosks. However, in the soft keyboard input method, since a letter input field and a soft keyboard have to be simultaneously displayed on a narrow area of the touchscreen, the size of keys of the soft keyboard is inevitably small. Accordingly, when a user touches letters on the soft keyboard, the user may unexpectedly touch adjacent letters, thereby resulting in typographical errors ("typos"). Particularly, if touches are made using a finger or a touch tool having a relatively broad touch area, or the soft keyboard is displayed on a small screen, there is a high possibility that typing errors may occur due to touch errors.

SUMMARY

Accordingly, it is an aspect of the embodiments to provide an image forming apparatus with a touchscreen and a method of editing input letters using the image forming apparatus. Additional aspects and/or advantages will be set forth in part in the description which follows and, in part, will be apparent from the description, or may be learned by practice of the embodiments.

The foregoing and/or other aspects are achieved by providing a method of editing letters input through a touchscreen of an image forming apparatus with a soft keyboard, the method including displaying an inputted text on the touchscreen using keys of the soft keyboard; receiving a letter to be edited from the displayed text; determining at least one of coordinates representing adjacent keys of the soft keyboard based on a coordinate corresponding to a location of the received letter on the touchscreen; displaying at least one of magnified images of the adjacent keys corresponding to the determined coordinates and function keys; selecting a key from the magnified image of the adjacent keys; and editing the displayed text using a letter corresponding to a key.

According to another embodiment, there is provided an image forming apparatus to edit letters input, including a display unit comprising a touchscreen to display a soft keyboard and a text input through the soft keyboard and keys of the soft keyboard; an input unit to receive a letter to be edited from the displayed text; a coordinate processing unit to determine at least one of coordinates representing adjacent keys of the soft keyboard based on a coordinate corresponding to a location of the received letter on the touchscreen; and a control unit controlling the display unit to display at least one of magnified images of the adjacent keys corresponding to the determined coordinates and functions keys and to edit the displayed text using a letter corresponding to one key that is selected from the magnified image of the adjacent keys.

According to another embodiment, there is provided a method of editing letters input through a touchscreen with a soft keyboard, the method including displaying an input text on the touchscreen using keys of the soft keyboard; receiving a letter to be edited from the displayed text; determining at least one of coordinates representing adjacent keys of the soft keyboard based on a coordinate corresponding to a location of the received letter on the touchscreen; displaying at least one of magnified images of the adjacent keys corresponding to the determined coordinates and functions keys; and editing the displayed text using a letter corresponding to a key that is selected from the magnified image of the adjacent keys.

BRIEF DESCRIPTION OF THE DRAWINGS

The above and other features and advantages of the embodiments will become more apparent by describing in detail exemplary embodiments thereof with reference to the attached drawings in which:

FIG. 7 is a flowchart illustrating a method of editing input letters through a touchscreen of a user interface device, according to another embodiment.

DETAILED DESCRIPTION

Figure 1:
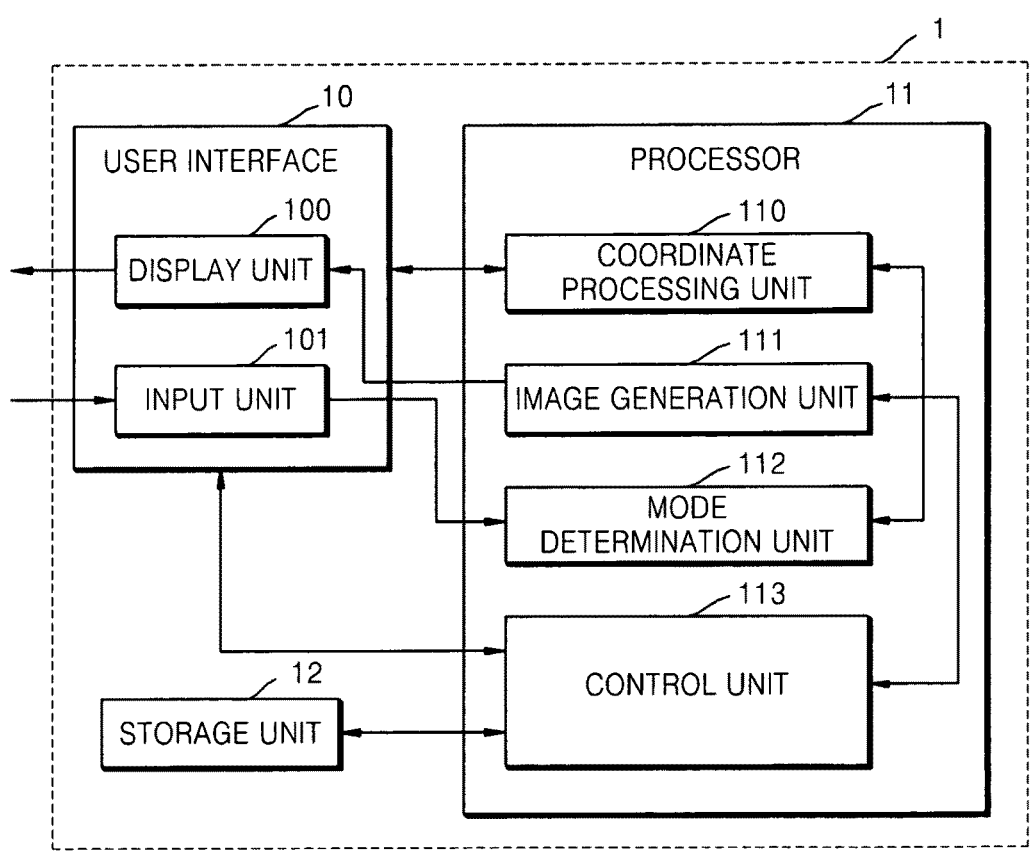
FIG. 1 is a block diagram illustrating a user interface device according to an embodiment.

Reference will now be made in detail to the embodiments, examples of which are illustrated in the accompanying drawings, wherein like reference numerals refer to the like elements throughout. The embodiments are described below by referring to the figures.

FIG. 1 is a block diagram illustrating a user interface device 1 provided in an image forming apparatus, according to an embodiment. Referring to FIG. 1, the user interface device 1 may include a user interface 10, a processor 11, and a storage unit 12. The processor 11 may include an image generation unit 111, a mode determination unit 112, and a control unit 113. The processor 11 may be implemented using an array of logic gates, or may be implemented using a combination of a general-purpose microprocessor and a memory stored with programs that may be executed in the general-purpose microprocessor. Also, it will be apparent to those skilled in the art that the processor 11 can be implemented using other types of hardware. For convenience of description, only hardware components related to the present embodiment will be described. However, it would be understood by those skilled in the art that other general-purpose hardware components besides the hardware components described in FIG. 1 may be included in the present embodiment.

Although FIG. 1 illustrates only components related to the user interface device 1 of the image forming apparatus, and omits other devices related to image forming functions of the image forming apparatus, persons skilled in the art can readily determine other types of the omitted general devices. The image forming apparatus may perform at least one of print, copy, scan, fax, and email functions.

The user interface device 1 shown in FIG. 1 may be used in user interface devices provided in electronic notebooks, mobile communication terminals, Personal Digital Assistants (PDAs), and kiosks, as well as an image forming apparatus.

A touchscreen refers to a screen that may detect the location of a touch to a letter or a specific location on a screen when the screen is touched by a hand or an object, not a mouse or a keyboard, and perform a specific processing corresponding to the detected location.

Thus, the touchscreen may perform a specific processing corresponding to a touch, display a user interface such as a soft keyboard and an input field displaying letters inputted by the soft keyboard, and display a result of the specific processing on the touchscreen. That is, when a user touches letters or pictures that are being displayed on a touchscreen with the finger, the user interface device 1 including the touchscreen may detect a user's selection according to the location of the touchscreen, and may process commands corresponding thereto to allow the user to process desired information. For example, the user interface device 1 provided in the image forming apparatus may receive an email address through the touchscreen, and may perform an image forming function to send generated information to the email address. Also, the user interface device 1 provided in a mobile communication terminal may receive a text message from a user through the touchscreen, and may send a text message to other people.

A user interface 10 may include a display unit 100 and an input unit 101. The user interface 10 may correspond to the touchscreen described above. Generally, the touchscreen may have a combined structure of a display panel such as an LCD and an LED and an input panel to for sense a touch of a user, which is understood by those skilled in the art. Here, the display panel may correspond to the display unit 100, and the input panel may correspond to the input unit 101. That is, the user interface device 1 may display information to a user through the user interface 10 such as a touchscreen, and receive information by a touch of a user.

The display unit 100 may display a user interface to a user through a touchscreen. The user may determine whether to input information or know the processing result of inputted information, by touching any part of the user interface displayed on the display unit 100.

More specifically, the display unit 100 may display a soft keyboard and a text inputted by the soft keyboard on the touchscreen. The inputted text may be displayed on an input field of the touchscreen separately from the soft keyboard. Besides, the display unit 100 may display at least one function key such as insert key, delete key, home key, end key, page up key, page down key, print screen key, scroll lock key, and pause/break key, or may display other icons, for example, a mode toggle icon to switch between an insert mode or overwrite mode.

The soft keyboard, which is a virtual key input tool, is a kind of user interface software implemented on a touchscreen similar to a real keyboard used as a physical input device in a PC and the like. Accordingly, a user can input desired letters by typing on the soft keyboard as if the soft keyboard displayed on the touchscreen was a real keyboard. Also, the input field may correspond to a field that shows letters inputted by a user through the soft keyboard. Accordingly, the letters inputted through the soft keyboard may be displayed on the input field.

The soft keyboard according to the embodiment is has the QWERTY keyboard layout that is being widely used, but is not limited thereto. For example, the soft keyboard may be arranged according to keyboard layouts of other languages such as Korean, Japanese, and Chinese. Accordingly, the input field text displayed on the display unit 100 may include various languages such as English, Korean, Japanese, and Chinese, as well as special letters or characters complying with the standards of various countries.

The input unit 101 may receive touch point information of a touchscreen touched by a user. When the input field of the touchscreen is touched, the input unit 101 may receive letters to be edited among the text displayed on the input field. The storage unit 12 may store coordinates of all locations of the touchscreen. Accordingly, the input unit 101 may receive the touch point information, and convert the touch point information into a coordinate stored in the storage unit 12.

For example, if a user touches a point corresponding to the letter A in the soft keyboard on the touchscreen, the input unit 101 may receive touch point information on, and convert the touch point information into a coordinate. As described below, the coordinate may be transmitted to a coordinate processing unit 110, and then the coordinate processing unit 110 may process the letter corresponding to this coordinate as being the letter A.

There are a resistive type and a capacitive type of touchscreen as a method for the input unit 101 to recognize a touch of a user. The resistive touchscreen may detect the pressure of a portion touched by a user to receive information of a touched point. The capacitive touchscreen may detect a distortion of the body's electrostatic field, measurable as a change in capacitance to receive the touch point information. The input unit 101 according to the embodiment may not be limited to the resistive type or the capacitive type, and may be implemented with any type thereof, or other types.

The coordinate processing unit 110 may process information corresponding to the coordinate transmitted from the input unit 101. As described above, if the corresponding coordinate represents a letter on the soft keyboard, the coordinate processing unit 110 may process letters as being input by a user. However, if the coordinate of the point touched by a user corresponds to a function key or an icon performing a specific command, the coordinate processing unit 110 may serve to process the specific command corresponding to the specific command.

Furthermore, the coordinate processing unit 110 may designate images that are to be displayed on corresponding coordinates, and may transmit the images to the display unit 100, so that user interfaces such as the soft keyboard, the input field, the function keys and icons, or letters to be displayed on the input field may be displayed on the display unit 100.

The control unit 113 may control operations of the display unit 100 and the input unit 101 of the user interface 10, and also control operations of the coordinate processing unit 110, the image generation unit 111, the mode determination unit 112, and the storage unit 12.

Recently, the size of a touchscreen of a mobile communication terminal has been increased. If the user interface device 1 according to the embodiment is a mobile communication terminal, PDA, or PMP that includes a full touchscreen, an appropriate size of the touchscreen may be between about 6 inches to about 7 inches in consideration of its portability and mobility. Accordingly, when a soft keyboard is displayed on the touchscreen of the mobile communication terminal, PDA, or PMP, the size of the displayed soft keyboard may be much less than the size of a real keyboard. Thus, when a user touches desired keys on the touchscreen, there is a higher possibility that the user makes a typographical error.

When a user corrects a typographical error by touching an input field of the user interface device 1, the letters adjacent to the mistyped letter may be enlarged on the soft keyboard, thereby facilitating correction of the mistype.

General operations of the display unit 100 and the input unit 101 of the user interface 10, and the coordinate processing unit 110 and the control unit 113 of the processor 11 have been described. Hereinafter, an operation of the user interface device 1 including the above units to correct a typographical error more easily will be described in detail.

When a soft keyboard and an input field are displayed on the display unit 100, a user may input desired letters by touching the soft keyboard, and verify whether the letters were exactly inputted through the input field. However, as described above, because of the size of the keys of the soft keyboard, a typing error may occur. When a typing error occurs in the course of inputting letters by touching the soft keyboard, a user may try to correct the typing error. Accordingly, the user may touch the mistyped letter on the input field to correct the typing error.

The input unit 101 may receive a coordinate of a letter displayed on a touched point when a user touches the input field. Thus, the letter displayed on the touch point may correspond to a letter recognized as a mistyped letter or to be edited by the user.

However, the size of the input field may be smaller than that of the keys displayed on the soft keyboard. Accordingly, it may be difficult for a user to exactly touch the mistyped letter on the input field. Therefore, when the input field is touched by a user, the display unit 100 may magnify the input letters displayed on the input field and then display the magnified input letters on the input field, and thus, a user can more exactly touch the letter that has been mistyped through the magnified input field. The magnifying and displaying of the input field may be appropriately set by a user according to the use environment.

When the magnified input field is displayed, the input unit 101 may receive the coordinate of the letter displayed on the point touched by a user from among letters displayed on the magnified input field.

The coordinate processing unit 110 may receive the coordinate, and process the letter corresponding thereto. More specifically, based on the coordinate corresponding to the location of the inputted letter on the touchscreen, the coordinate processing unit 110 may determine at least one coordinate of adjacent keys of the soft keyboard. The coordinate processing unit 110 may send the determined coordinates to the image generation unit 111 to generate a magnified image.

The image generation unit 111 may generate a magnified image showing the key of the letter displayed on the touched point and adjacent keys within a certain distance from the key of the letter. For example, in a soft keyboard having the QWERTY keyboard layout, when a user touches the letter S to correct the letter S among letters displayed on the input field, a magnified image including the key of the letter S and the keys of the alphabetical letters W, E, A, D, Z, and X may be generated. That is, the keys directly adjacent to the letter S are magnified together with the letter S and displayed. However, without being limited thereto, a magnified image may be generated including keys within a broader range from the mistyped key according to the use environment. The reason for magnifying the adjacent keys together with the mistyped key is that there is a high possibility that an originally desired letter exists among the adjacent keys when a user makes a typographical error.

As described above, the image generation unit 111 may generate a magnified image according to a range of adjacent keys predetermined by a user, but may also be modified to generate a different type of magnified image according to the presence or absence of adjacent keys or the error history of counting the typing errors of the input text. That is, when a user intends to correct the letter S displayed on the input field, the user may allow a magnified image including keys, such as the letter P, far away from the letter S, instead of the adjacent keys, to be generated. A user may also store a previously inputted text and a previously corrected text, and generate a magnified image including keys included in an error history by referring to the error history later.

The image generation unit 111 may send the generated magnified image to the display unit 100, and then the display unit 100 may display the magnified image. In order to display the magnified image, the coordinate processing unit 110 may designate a coordinate where the magnified image is to be displayed, and transmit the coordinate to the display unit 100. The display unit 100 may display the magnified image in an area of the soft keyboard. Also, the display unit 100 may further display a magnified image of the function keys in addition to the magnified image.

Figure 2A:
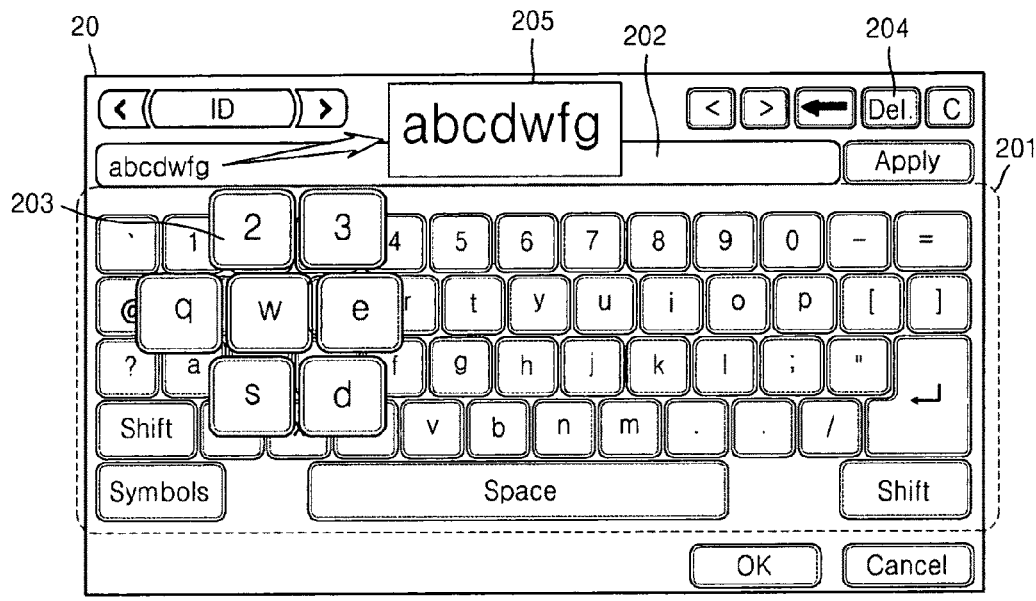
FIG. 2A is a diagram illustrating a screen displayed by a display unit according to an embodiment.
Figure 2B:
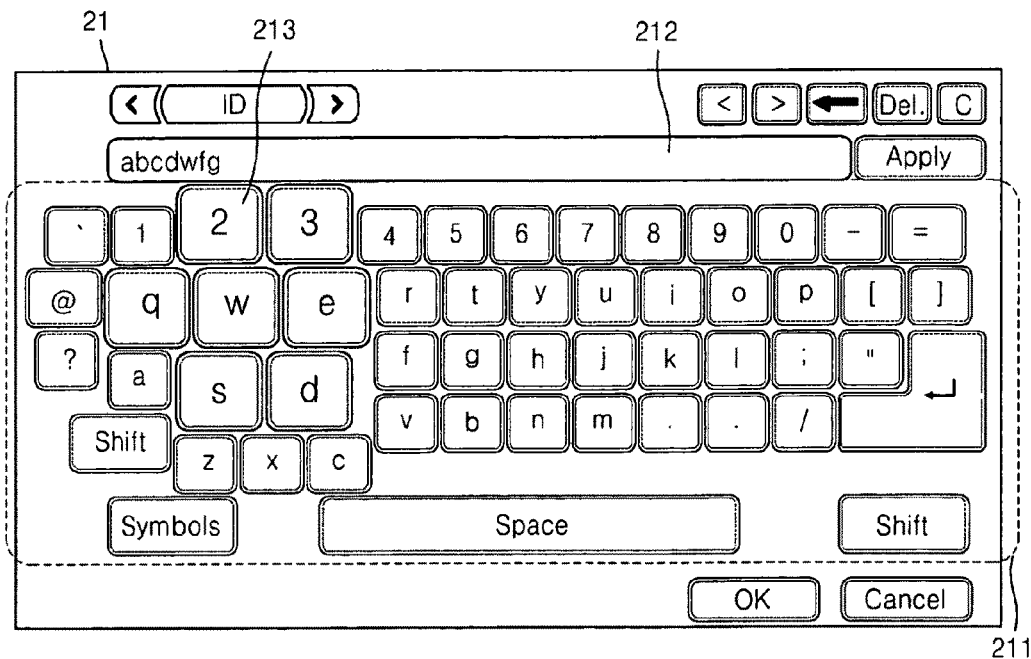
FIG. 2B is a diagram illustrating a magnified image displayed by a display unit so as not to overlap a soft keyboard, according to an embodiment.

More specifically, the display unit 100 may display the soft keyboard and the magnified image to overlap each other, or may display the other keys except the keys in the magnified image to be pulled back in all directions so as not to overlap the magnified image. However, the magnified image may not be displayed only on the area of the soft keyboard, but may also be displayed on another location of the touchscreen (i.e., a center of the touchscreen or a top of the touchscreen) according to the convenience of a user. The magnified image displayed as overlapping the soft keyboard is shown in FIG. 2A, and the magnified image displaying other keys of the soft keyboard, except for the keys displayed in the magnified image, as being pulled back in all directions so as not to overlap the magnified image is shown in FIG. 2B.

Furthermore, the display unit 100 may display the magnified image to differentiate from the keys of the soft keyboard. That is, the display unit 100 may display the magnified image to be different from the soft keyboard in terms of font, font color, and font size. When one of the keys of the magnified image on the display unit 100 is touched and selected by a user, the input unit 101 may receive the coordinate of a new letter displayed on the touched point. The new letter selected at the touched point may correspond to a correct letter, not a mistyped letter. Since a magnified image that is larger than the original keys of the soft keyboard is displayed on the display unit 100, a user may input originally desired letters using the magnified image.

The control unit 113 may control the operations of the respective components of the display unit 100, the input unit 101, the coordinate processing unit 110, the image generation unit 111, the mode determination unit 112, and the storage unit 12 so that the respective components perform their functions.

More specifically, the control unit 113 may control the display unit 100 to magnify and display at least one of the magnified images of adjacent keys corresponding to the determined coordinate and function keys. When one key of the magnified image is selected, the control unit 113 may control text displayed on the input field to be edited using the letter corresponding to the selected key. Also, the control unit 113 may control the text displayed on the input field to be corrected or inserted with the letter corresponding to the selected key. The control unit 113 may control the magnified image and the function key to be closed after the editing of the text is completed.

The storage unit 12 may store the coordinates of the soft keyboard and the input field displayed on the display unit 100 and the magnified images, and may send the stored information to the display unit 100 so as to be displayed. Also, the storage unit 12 may store information such as a text inputted by a user, and may store the coordinates corresponding to the locations of the respective letters of the inputted text on the touchscreen. The storage unit 12 may also store the results processed by the respective components of the user interface device 1.

As described above, the user interface device 1 may generate a magnified image with respect to a key of a mistyped letter and keys adjacent thereto, and display the magnified image on the display unit 100, thereby facilitating correction of the mistyped letter. Hereinafter, operations of other components and a case where a user does not touch a magnified image will be described.

The mode determination unit 112 may determine whether, after a letter is inputted into the input unit 101, the input mode by the soft keyboard is an overwrite mode or an insert mode. Here, the overwrite mode is a mode to replace an existing letter with a new letter, and the insert mode is a mode to add a new letter between existing letters. Such modes may be switched between each other by performing at least one of a double click, a single click, a long click and a toggle key click on the touchscreen.

If the input mode is an overwrite mode according to the determination result of the mode determination unit 112, the display unit 100 may display the magnified image generated in the image generation unit 111. The reason to display the magnified image is to allow a user to correct a mistyped letter easily. However, if the input mode is an insert mode according to the determination result of the mode determination unit 112, the display unit 100 may not display the magnified image because a user intends not to correct a type error but to input additional letters.

So far, it has been described that a user corrects a mistyped letter with a correct letter by touching a magnified image. However, a user may touch other areas instead of an area in which a magnified image is displayed. In this case, the user interface device 1 may be operated as follows.

When a magnified image is displayed, the coordinate processing unit 110 may determine whether an area in which the magnified image is displayed is touched by a user. That is, the coordinate processing unit 110 may determine whether a point touched by a user corresponds to keys displayed in the magnified image. If the area in which the magnified image is displayed is touched by a user, the input unit 101, as described above, may receive a coordinate of a new letter displayed in the magnified image to change a mistyped letter into a new letter.

However, if a key of the soft keyboard, other than the magnified image, is touched, the control unit 113 may control text displayed on the input field to be edited using a letter corresponding to the touched key of the soft keyboard.

More specifically, when the coordinate processing unit 110 determines that another area other than the area in which the magnified image is displayed was touched, the control unit 113 may hide the magnified image to complete the overwrite mode. This is because a user touches the other area not to correct a type error, but to instead input new, additional, letters. According to the insert mode after the overwrite mode, the display unit 100 may additionally display letters newly inputted through the soft keyboard on the input field. More specifically, when the other area touched by a user is an area in which a soft keyboard is displayed, the input unit 101 may receive a coordinate of the touched point, and then the display unit 100 may display a letter corresponding to the coordinate on the input field according to the insert mode. Thereafter, the control unit 113 may control the magnified image to be closed to complete the overwrite mode.

The magnified image generated in the image generation unit 111 according to the embodiment may be an image in which a key of a letter corresponding to a type error and other keys within a certain range from the key are magnified. A user may correct the type error using the magnified image. Hereinafter, other embodiments will be described in detail.

When a user verifies a mistyped letter on an input field, the user has to touch the location of the mistyped letter exactly. As described above, if the input field is magnified and displayed according to the settings set by a user, the user may touch the location of the mistyped letter exactly. However, if the input field is not magnified and displayed according to the settings of a user, the size of the input field may also be small, as in the soft keyboard. Accordingly, there is a possibility that another letter adjacent to the mistyped letter is touched instead of the mistyped letter.

According to another embodiment, a magnified image including keys of letters adjacent to a letter of the touched point and other keys adjacent to the keys may be displayed, thereby allowing a user to correct a typing error more easily. According to another embodiment, letters displayed on the input field may be displayed in different colors or patterns, thereby allowing a user to correct a typo more precisely. These embodiments may be applied to both cases where the input field is magnified and displayed, and the input field is not magnified and displayed.

The operations of components of the user interface device 1, according to another embodiment, will be described as follows.

Figure 3:
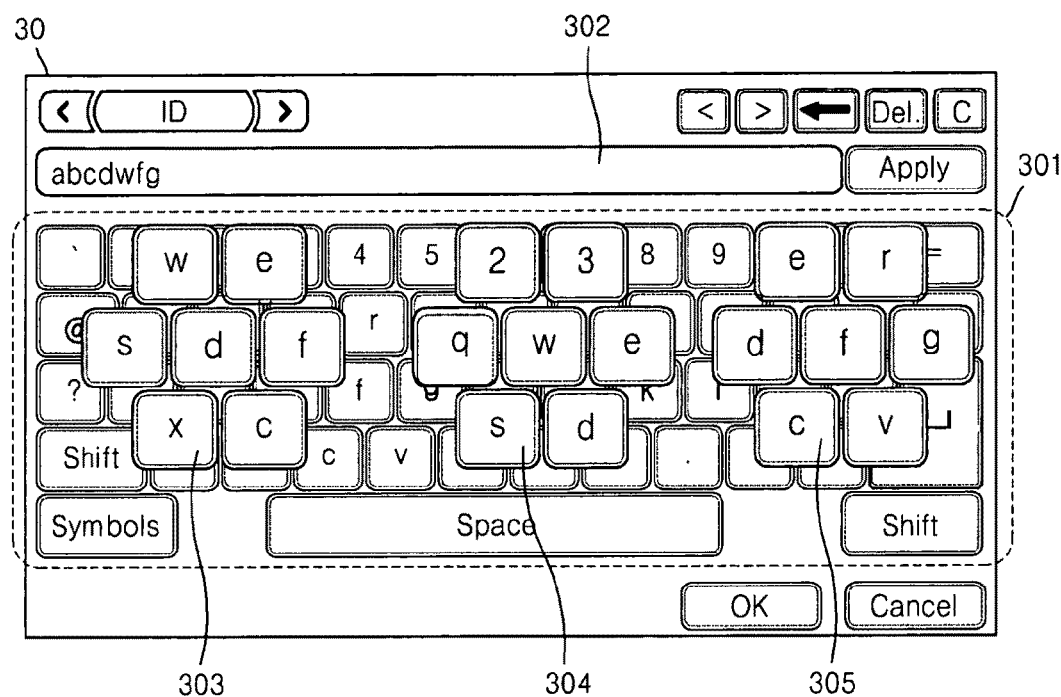
FIG. 3 is a diagram illustrating a screen displayed by a display unit according to another embodiment.

The display unit 100 may display magnified images including an input letter in a displayed text and adjacent keys corresponding to a certain number of letters adjacent to the input letter. The magnified images may also be generated in the image generation unit 111. That is, the display unit 100 may display the magnified images including keys of the letters adjacent to the letter of an additionally touched point and keys adjacent thereto in addition to an originally displayed magnified image. The magnified images displayed on the display unit 100 are shown in FIG. 3.

When at least one of the keys displayed on other magnified images is touched by a user, the input unit 101 may further receive the coordinate of the letter displayed on at least one touched point. Then, the control unit 113 may control at least one of the letters displayed on the input field to be replaced with the corresponding letter displayed on at least one touched point.

The operations of components of the user interface device 1, according to another embodiment, will be described as follows.

The display unit 100 may change a letter of a touched point on the input field and a certain number of letters adjacent to the letter into different colors or patterns, and then display the letters of different colors or patterns on the input field. For example, when the same letters are continuously input into a text, the same letters may be displayed in different colors or patterns.

Figure 4:
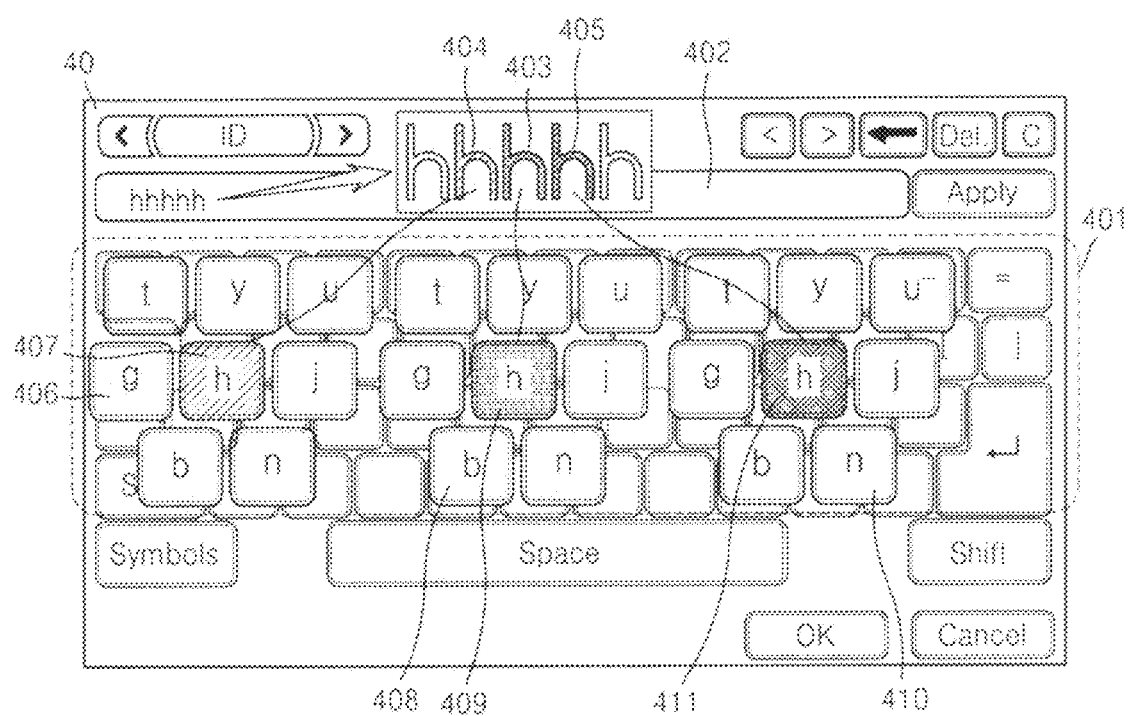
FIG. 4 is a diagram illustrating a screen displayed by a display unit according to another embodiment.

The image generation unit 111 may continuously generate magnified images of adjacent keys corresponding to the respective same letters in different colors or patterns. The display unit 100 may display the generated magnified images. The letters of the input field and the magnified images displayed in different colors or patterns are shown in FIG. 4.

According to the operations of the components of the user interface device 1 according to the embodiments, a user can easily find a typographical error on the input field, and can correct the typo with a correct letter more easily.

FIG. 2A is a diagram illustrating a screen displayed by a display unit according to an embodiment. Referring to FIG. 2A, a display unit (100 of FIG. 1) may display a soft keyboard 201, an input field 202, and a mode toggle icon 204 on a touchscreen 20. The mode toggle icon 204 may be used to switch an input mode into an overwrite mode or an insert mode.

For example, a user may input abcdwfg using the soft keyboard 201, and then the display unit 100 may display abcdwfg on the input field 202. For example, it will be assumed that a user recognizes w of the letters displayed on the input field 202 as a mistyped letter If a user touches the input field 202, the magnified input field 205 may be displayed. The user may touch w corresponding to a typo from the magnified input field 205. The input unit (101 of FIG. 1) may convert the touch point information of w into a coordinate, and send the coordinate to the coordinate processing unit (110 of FIG. 1). The coordinate processing unit 110 may process a letter corresponding to the coordinate as corresponding to w, and send the processing result to the image generation unit (111 of FIG. 1). The image generation unit 111 may generate a magnified image 203 including the key w and the keys 2, 3, q, e, s, and d. The generated magnified image 203 may be displayed on the touchscreen 20 by the display unit (100 of FIG. 1). In FIG. 2, the magnified image 203 has been illustrated to overlap the soft keyboard 201, but the embodiments are not limited thereto.

Thereafter, a user may touch one of the keys displayed on the magnified image 203 to correct the mistyped letter w displayed on the input field with a correct letter. Since the letters displayed on the magnified image 203 are enlarged, compared to the letter keys displayed on the soft keyboard 201, a user can touch the correct letter more easily. If the correct letter is inputted by a user, the control unit (113 of FIG. 1) may control the display unit 100 to display the correct letter instead of the mistyped letter.

If a user touches another area other than an area of the magnified image 203, as described above, the input mode may be switched from overwrite mode to insert mode.

FIG. 2B is a diagram illustrating a magnified image displayed by a display unit so as not to overlap a soft keyboard, according to another embodiment. Referring to FIG. 2B, other keys of a soft keyboard 211, except keys displayed in a magnified image 213 on a touchscreen 21 may be pulled back in all directions so as not to overlap the magnified image 213.

Although not shown in FIGS. 2A and 2B, the display unit (100 of FIG. 1) may further display function keys such as a home key, an end key, a page-up key, a page-down key, a print screen key, a scroll lock key, and a pause/break key.

A user may easily determine whether to display the magnified image 203 as shown in FIG. 2A or the magnified image 213 as shown in FIG. 2B according to the use environment.

Also, although not shown in FIG. 2B, the magnified input field 205 as shown in FIG. 2A may be displayed according to the settings set by a user.

FIG. 3 is a diagram illustrating a screen displayed by a display unit according to another embodiment. Referring to FIG. 3, other magnified images 303 and 305 may be further displayed according to another embodiment. The magnified images 303 and 305 may include keys of a certain number of letters adjacent to a mistyped letter and other keys within a certain range on the soft keyboard 301 from the certain number of the letters. Although not shown in FIG. 3, the magnified input field 205 as shown in FIG. 2A may be displayed according to the settings set by a user.

For example, a user may recognize the letter d displayed on the input field 302 as a mistyped letter, and try to touch the letter d, but may mistype by touching the letter w due to the small size of the input field 302. Accordingly, in addition to the touched letter w, the letters d and f respectively on the right and left of the letter w displayed on the input field 302 may be further displayed in the magnified images 303 and 305.

The display unit (100 of FIG. 1) may display a magnified image 304 including the key w and the keys adjacent to the key w, and further display the magnified image 303 including the key d and the keys adjacent to the key d and the magnified image 305 including the key f and the keys adjacent to the key f. A user may touch a correct letter from the magnified image 303 displaying the key d at the center thereof among the magnified images 303, 304 and 305 in order to correct letter d that was recognized as a mistyped letter. Thereafter, the control unit (113 of FIG. 1) may control the display unit (100 of FIG. 1) to display the correct letter instead of the mistyped letter.

FIG. 4 is a diagram illustrating a screen displayed by a display unit according to another embodiment. Referring to FIG. 4, letters displayed on an input field 402 and magnified images 406, 408 and 410 may be displayed in different colors and patterns. Although not shown in FIG. 4, the magnified input field 205 as shown in FIG. 2A may be displayed according to the settings set by a user.

When a user inputs the same letter h 403, 404 and 405 multiple times, the user may recognize the letter h 403 as a mistyped letter. However, the user may not touch the mistyped letter exactly because the size of the letters displayed on the input field 402 is small and the same letter h 403, 404 and 405 has been inputted multiple times. In this case, the display unit (100 of FIG. 1) may display the respective letters h 403, 404 and 405 in different colors or patterns. Also, the respective keys h 403, 404 and 405 at the centers of magnified images 406, 408 and 410 may be displayed corresponding to the different colors or patterns displayed on the input field 402. When the letters h 403, 404 and 405 and the keys h 407, 409 and 411 are displayed in different colors or patterns, the letters are more readily differentiated from each other by the colors and patterns, thereby allowing a user to easily find and correct the typo. Although the same letters are shown in FIG. 4, the embodiments may also be applied to different letters.

Figure 5:
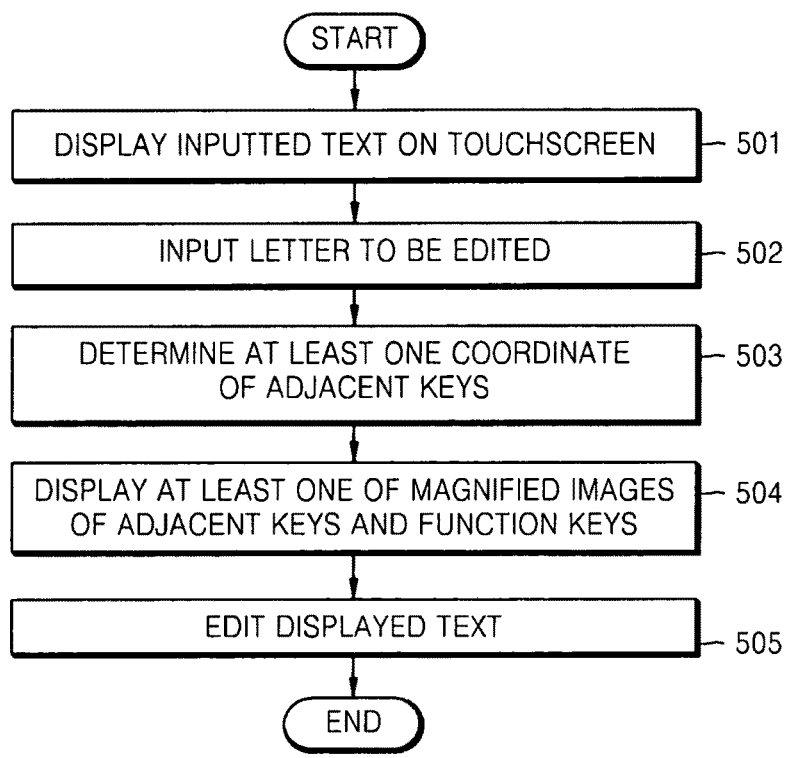
FIG. 5 is a flowchart illustrating a method of editing input letters through a touchscreen of a user interface device, according to an embodiment.

FIG. 5 is a flowchart illustrating a method of editing input letters through a touchscreen of a user interface device, according to an embodiment. Referring to FIG. 5, the method of editing input letters through a touchscreen of the user interface device 1 may include operations processed chronologically in the user interface device 1 of FIG. 1. Accordingly, although omitted below, the above description of the user interface device 1 of FIG. 1 may also be applied to the method of editing input letters through the touchscreen of the user interface device 1.

In operation S501, the display unit 100 may display a text input with keys of a soft keyboard on an input field of a touchscreen.

In operation S502, the input unit 101 may receive letters to be edited from the text displayed on the input field.

In operation S503, a coordinate processing unit 110 may determine at least one of the coordinates representing adjacent keys using a coordinate corresponding to the location of the inputted letter on the touchscreen.

In operation S504, the display unit 100 may display at least one of the magnified images of the adjacent keys corresponding to the determined coordinate and function keys.

In operation S505, when one key is selected from the magnified images of the magnified adjacent keys, the control unit 113 may control the text to be edited using a letter corresponding to the selected key.

Figure 6:
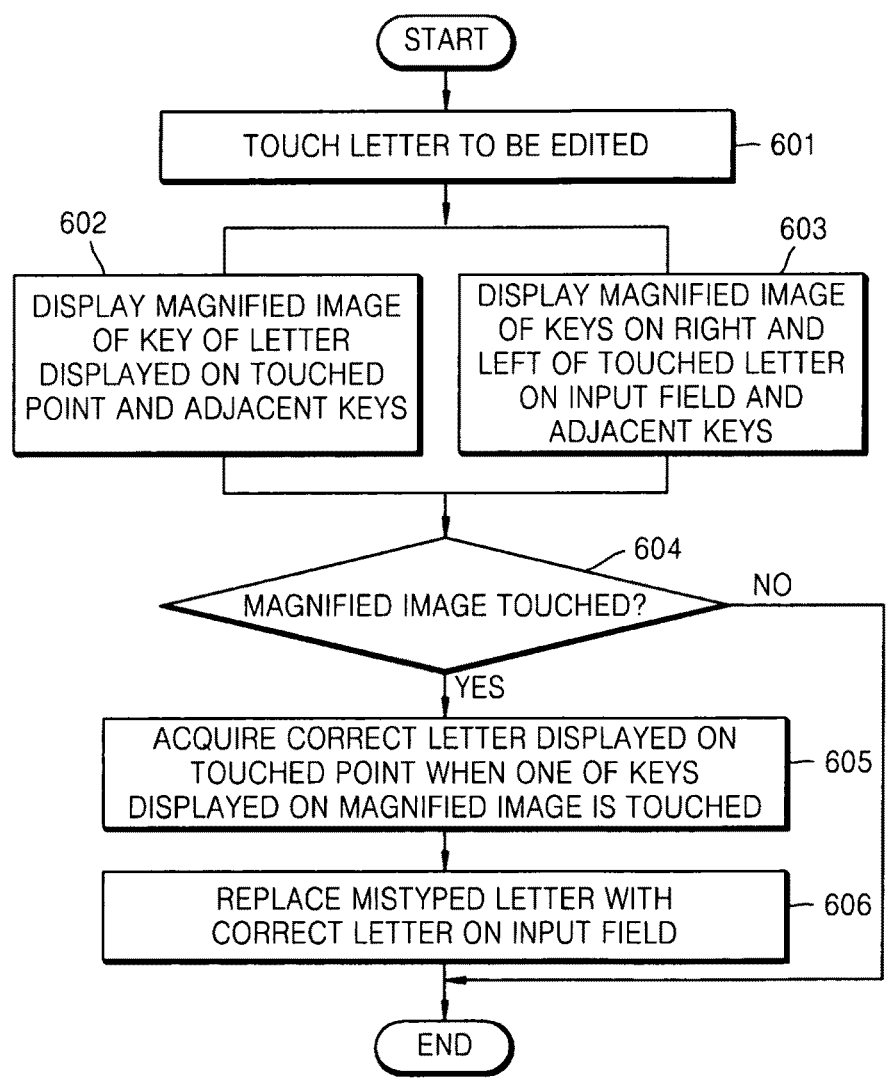
FIG. 6 is a flowchart illustrating a method of editing input letters through a touchscreen of a user interface device, according to another embodiment.

FIG. 6 is a flowchart illustrating a method of editing input letters through a touchscreen of a user interface device, according to another embodiment.

In operation S601, when a user touches an input field, the input unit 101 may receive a coordinate of a letter displayed on a touched point of a text displayed on the input field. The letter displayed on the touched point may correspond to a letter that a user intends to edit, or one of the letters on the right and left of the letter displayed on the touch point may correspond to the letter that the user intends to edit.

In operation S602, the image generation unit 111 may generate a magnified image including a key of a letter corresponding to a mistyped letter and other adjacent keys within a certain range on a soft keyboard from the key. The image generation unit 111 may send the generated magnified image to the display unit 100, and then the display unit 100 may display the magnified image.

In operation S603, the image generation unit 111 may further generate other magnified images including keys of a certain number of letters on the right and left of a letter of a touch point of the input field and other adjacent keys within a certain range on the soft keyboard from the respective keys. The image generation unit 111 may send the generated magnified images to the display unit 100, and then the display unit 100 may further display the magnified images.

In operation S604, when the magnified image is displayed, a coordinate processing unit 110 may determine whether the magnified image has been touched by a user. If the magnified image has been touched by a user, the procedure may progress to operation S605. Otherwise, if the magnified image has not been touched by a user, the overwrite mode is completed, and newly inputted letters are additionally displayed on the input field according to the insert mode.

In operation S605, the input unit 101 may receive a coordinate of a new letter corresponding to at least one touched point of the letters displayed on the magnified image.

In operation S606, the control unit 113 may control a letter on the input field corresponding to a mistyped letter to be replaced with a new letter displayed on at least one touch point of the magnified image. That is, when a user touches the correct letter according to the control of the control unit 113, the mistyped letter of the input field may be replaced with the correct letter.

FIG. 7 is a flowchart illustrating a method of editing input letters through a touchscreen of a user interface device, according to another embodiment.

In operation S701, when the input field is touched by a user, the input unit 101 may receive the coordinate of the letter displayed on the touched point. The letter displayed on the touched point may correspond to the mistyped letter recognized by a user, or one of letters on the right or left of the letter displayed on the touched point may correspond to the mistyped letter.

In operation S702, the display unit 100 may change the letter of the touched point and a certain number of letters on the right and left of the letter into different colors and patterns, and then display the letters having different colors and patterns on the input field.

In operation S703, the image generation unit 111 may generate a magnified image including a key of a letter corresponding to a mistyped letter and other adjacent keys within a certain range on a soft keyboard from the key. The image generation unit 111 may send the generated magnified image to the display unit 100, and then the display unit 100 may display the magnified image. Here, the key displayed on the center of the magnified image may be changed corresponding to the color or pattern of the letter displayed on the input field, and then be displayed.

In operation S704, the image generation unit 111 may further generate other magnified images including keys of a certain number of letters on the right and left of a letter of a touch point of the input field and other adjacent keys within a certain range on the soft keyboard from the respective keys. The image generation unit 111 may send the generated magnified images to the display unit 100, and then the display unit 100 may further display the magnified images. Here, the key displayed on the center of the magnified image may be changed corresponding to the color or pattern of the letter displayed on the input field, and then be displayed.

In operation S705, when the magnified image is displayed, the coordinate processing unit 110 may determine whether the magnified image has been touched by a user. If the magnified image has been touched by a user, the procedure may progress to operation S706. Otherwise, if the magnified image has not been touched by a user, the overwrite mode is completed, and newly inputted letters are additionally displayed on the input field according to the insert mode.

In operation S706, the input unit 101 may receive a coordinate of a new letter corresponding to at least one touched point of the letters displayed on the magnified image.

In operation S707, the control unit 113 may control a letter on the input field corresponding to a mistyped letter to be replaced with a new letter displayed on at least one touch point of the magnified image. That is, when a user touches the correct letter according to the control of the control unit 113, the mistyped letter of the input field may be replaced with the correct letter.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

When a user selects a mistyped letter from an input field of a touchscreen, letters adjacent to the corresponding letter on a soft keyboard may be enlarged, thereby allowing a user to replace the mistyped letter with a correct letter and reducing the inconvenience of clicking the backspace key. Also, even when it is difficult for a user to select a mistyped letter due to the narrowness of an input field, the mistyped letter can easily be replaced with the correct letter by enlarging adjacent letters corresponding to letters of the input field adjacent to the mistyped letter. Furthermore, since the color and pattern of the letters adjacent to the mistyped letter may be differently displayed, the mistyped letter can easily be recognized and be replaced with a correct letter.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A method of editing letters inputted through a touchscreen of an image forming apparatus with a soft keyboard, the method comprising:
    displaying a text inputted using keys of the soft keyboard on an input field of the touchscreen;
    receiving a letter to be edited among the displayed text, through the input field;
    determining at least one of adjacent keys neighbored to a key of the received letter on the soft keyboard, based on a location of the key of the received letter on the soft keyboard of the touchscreen;
    determining whether an input mode by the soft keyboard is an overwrite mode or an insert mode;
    when determined that the input mode is the overwrite mode, displaying at least one of magnified images including the key of the received letter and the adjacent keys on the soft keyboard to overlap the soft keyboard;
    when determined that the input mode is the insert mode, not displaying any of the magnified images;
    selecting a key from the magnified image displayed on the soft keyboard;
    editing the displayed text using a letter corresponding to the selected key;
    when determined that an area in which at least one of the keys of the soft keyboard is located, and not the area in which the at least one of magnified images is located, is touched by a user through the touchscreen, converting the input mode to the insert mode and inputting a letter corresponding to the at least one of the keys of the soft keyboard when displaying the at least one of magnified images; and
    removing the magnified images after the displayed text is edited,
    wherein the displaying of the inputted text comprises displaying a letter input consecutively a predetermined number of times into the inputted text in different colors or patterns, and the displaying of at least one of the magnified images comprises displaying magnified images of adjacent keys corresponding to the respective same letters in different color or patterns.

2. The method of claim 1, further comprising storing coordinates corresponding to locations of keys of the respective letters of the inputted text on the touchscreen.

3. The method of claim 1, wherein the displaying of at least one of the magnified images comprises displaying the magnified image to differentiate from the keys of the soft keyboard.

4. The method of claim 1, wherein the editing of the displayed text comprises correcting the displayed text using the letter corresponding to the selected key or inserting the letter corresponding to the selected key into the displayed text.

5. The method of claim 1, wherein the editing of the displayed text comprises editing the displayed text using a letter corresponding to a key of the soft keyboard that is selected instead of the magnified image.

6. The method of claim 1, wherein the displaying of at least one of the magnified images comprises changing adjacent keys displayed in the magnified image according to a predetermined range of the adjacent keys, presence or absence of the adjacent keys, or an error history comprising counting the typing errors of the input text, wherein the changing of adjacent keys is performed by a user.

7. The method of claim 1, wherein the displaying of at least one of the magnified images comprises displaying magnified images comprising the input letter in the displayed text and adjacent keys corresponding to a certain number of letters on the right and left of the key of the received letter.

8. The method of claim 1, further comprising determining whether an edit mode is an overwrite mode or an insert mode after the letters to be edited are received, wherein the editing of the displayed text comprises editing the displayed text in a mode according to a result of the determination.

9. The method of claim 8, wherein the overwrite mode and the insert mode are switched between each other by performing at least one of a double click, a single click, a long click, and a toggle key click on the touchscreen.

10. The method of claim 1, further comprising determining at least one of coordinates representing adjacent keys of the soft keyboard based on a coordinate corresponding to a location of a letter adjacent to the received letter on the soft keyboard of the touchscreen.

11. The method of claim 1, wherein the selecting a key comprises touching the key on the soft keyboard.

12. An image forming apparatus to edit letters input, comprising:
    a display unit comprising a touchscreen to display keys on a soft keyboard and a text inputted through the soft keyboard on an input field;
    an input unit to receive a letter to be edited among the displayed text through the input field;
    a coordinate processing unit to determine at least one of adjacent keys neighbored to a key of the received letter on the soft keyboard based on a location of the key of the received letter on the soft keyboard of the touchscreen and to determine whether an area in which at least one of the keys of the soft keyboard is located, and not the area in which the at least one of magnified images is located, is touched by a user through the touchscreen;
    a mode determination unit to determine whether an input mode is an overwrite mode or an insert mode; and
    a control unit to control the display unit,
    wherein:
        at least one of the magnified images including the key of the received letter and the adjacent keys on the soft keyboard to overlap the soft keyboard is displayed by the display unit when determined, by the mode determination unit, that the input mode is the overwrite mode, none of the magnified images are displayed by the display unit when determined, by the mode determination unit, that the input mode is the insert mode, the control unit edits the displayed text using a letter corresponding to one key that is selected from the magnified image displayed on the soft keyboard, the control unit converts the input mode to the insert mode when determined, by the coordinate processing unit, the area in which the at least one of the keys of the soft keyboard is located, and not the area in which the at least one of magnified images is located, is touched by a user through the touchscreen, the control unit inputs a letter corresponding to the at least one of the keys of the soft keyboard when displaying the at least one of magnified images, and the display unit displays letters input consecutively a predetermined number to times into the input text in different colors or patterns, and the control unit controls the display unit to display the magnified images of adjacent keys corresponding to the respective same letters in different colors or patterns.

13. The image forming apparatus of claim 12, further comprising a storage unit to store the coordinates corresponding to locations of keys of the respective letters of the input text on the touchscreen.

14. The image forming apparatus of claim 12, wherein the display unit displays the magnified image to differentiate from the keys of the soft keyboard.

15. The image forming apparatus of claim 12, wherein the control unit controls the display unit to display the magnified images of adjacent keys corresponding to the input letter of the display text and a certain number of letters on the right and left of the input letter.

16. A method of editing letters input through a touchscreen with a soft keyboard, the method comprising:

displaying a text inputted using keys of the soft keyboard on an input field of the touchscreen;

receiving a letter to be edited among the displayed text, through the input field;

determining at least one of adjacent keys neighbored to a key of the received letter on the soft keyboard, based on a location of the key of the received letter on the soft keyboard of the touchscreen;

determining whether an input mode by the soft keyboard is an overwrite mode or an insert mode;

when determined that the input mode is the overwrite mode, displaying at least one of magnified images including the key of the received letter and the adjacent keys on the soft keyboard to overlap the soft keyboard;

when determined that the input mode is the insert mode, not displaying any of the magnified images;

editing the displayed text using a letter corresponding to a key that is selected from the magnified image displayed on the soft keyboard;

when determined that an area in which at least one of the keys of the soft keyboard is located, and not the area in which the at least one of magnified images is located, is touched by a user through the touchscreen, converting the input mode to the insert mode and inputting a letter corresponding to the at least one of the keys of the soft keyboard when displaying the at least one of the magnified images;

removing the magnified images after the displayed text is edited; and determining whether the inputted text comprises a same letter inputted multiple times in a row; and when determined that the inputted text comprises a same letter inputted multiple times in a row, displaying a plurality of magnified images of keys corresponding to the same letter in different colors or patterns and keys adjacent to the keys corresponding to the same letter.

17. The method of claim 16, further comprising storing coordinates corresponding to locations of keys of the respective letters of the inputted text on the touchscreen.

18. The method of claim 16, wherein the displaying of at least one of the magnified images comprises displaying the magnified image to differentiate from the keys of the soft keyboard.

19. A method of editing letters inputted by a soft keyboard through a touchscreen of a mobile device, the method comprising:

receiving a letter to be edited among a displayed text, through an input field on the touchscreen;

determining at least one of adjacent keys neighbored to a key corresponding to the received letter, based on locations of keys on the soft keyboard; determining whether an input mode by the soft keyboard is an overwrite mode or an insert mode;

when determined that the input mode is the overwrite mode, displaying at least one of a magnified image of the corresponded key and the adjacent keys on the touchscreen to overlap an area on which the soft keyboard is displayed;

when determined that the input mode is an insert mode, not displaying any of the magnified images;

when determined that an area in which at least one of the keys of the soft keyboard is located, and not the area in which the at least one of magnified images is located, is touched by a user through the touchscreen, converting the input mode to the insert mode and inputting a letter corresponding to the at least one of the keys of the soft keyboard when displaying the at least one of magnified images;

removing the magnified images after the displayed text is edited;

determining whether the inputted text comprises a same letter inputted multiple times in a row; and when determined that the inputted text comprises a same letter inputted multiple times in a row, displaying a plurality of magnified images of keys corresponding to the same letter in different colors or patterns and keys adjacent to the keys corresponding to the same letter.

20. A mobile device configured to edit letters inputted by a soft keyboard through a touchscreen, the method comprising:

an input unit to receive a letter to be edited among a displayed text, through an input field on the touchscreen;

a processing unit to determine at least one of adjacent keys neighbored to a key corresponding to the received letter, based on locations of keys on the soft keyboard, to determine whether an input mode by the soft keyboard is an overwrite mode or an insert mode, to determine whether an area in which at least one of the keys of the soft keyboard is located, and not the area in which the at least one of magnified images is located, is touched by a user through the touchscreen, and when determined that the area in which at least one of the keys of the soft keyboard is located, and not the area in which the at least one of magnified images is located, is touched by a user through the touchscreen, to convert the input mode to the insert mode and to input a letter corresponding to the at least one of the keys of the soft keyboards when displaying the at least one of magnified images; and a display unit to display at least one of a magnified image of the corresponded key and the adjacent keys on the touchscreen to overlap an area on which the soft keyboard is displayed when determined, by the processing unit, that the input mode is the overwrite mode, and not to display any of the magnified images when determined, by the processing unit, that the input mode is the insert mode, wherein the display unit displays letters input consecutively a predetermined number of times into the input text in different colors or patterns, and the processing unit controls the display unit to display the magnified images of adjacent keys corresponding to the respective same letters in different colors or patterns.

* * * * *